United States Patent [19]
Jeffers et al.

[11] 3,722,556
[45] Mar. 27, 1973

[54] ROLLING PIPE LINE ASSEMBLY, SYSTEM AND METHOD

[76] Inventors: William Jeffers, 6235 W. 8th Place, Oak Lawn, 60459; James Michael Jeffers, 105 Twin Oaks Drive, both of Joliet Ill. 60435

[22] Filed: Aug. 19, 1971

[21] Appl. No.: 176,765

[52] U.S. Cl. ..................141/2, 105/358, 141/18, 141/113, 141/231, 141/327, 222/145, 285/97
[51] Int. Cl. ..........................B65b 1/04, B65b 3/04
[58] Field of Search......141/183, 35, 21, 36, 100, 67, 141/105, 99, 231-233, 236, 237, 242, 243, 244, 346, 347, 385-387; 285/97, 336, 367; 222/145; 213/76; 61/10; 105/358, 360; 141/1, 2, 18; 277/34.3

[56] References Cited

UNITED STATES PATENTS

| | | | |
|---|---|---|---|
| 557,613 | 4/1896 | Sattelkau | 141/113 |
| 3,501,059 | 3/1970 | Van Der Lely | 141/18 |

*Primary Examiner*—Houston S. Bell, Jr.
*Attorney*—Dominik, Knechtel & Godula

[57] ABSTRACT

A rolling pipe line system and method is disclosed comprising a plurality of wheeled tank cars, each of the tank cars being provided with one pipe extending outwardly from adjacent one end and another pipe extending outwardly from adjacent the other end thereof, and connector means for interconnecting adjacent pipes extending outwardly from adjoining tank cars thereby to establish fluid communication as between adjoining tank cars throughout the complete series of such tank cars. The system and method permits the loading, transporting and unloading of a fluid from the interconnected tank cars without the necessity of loading and unloading each of the tank cars individually.

16 Claims, 8 Drawing Figures

PATENTED MAR 27 1973  3,722,556

INVENTORS
WILLIAM JEFFERS
JAMES MICHAEL JEFFERS

BY *Dominik, Knechtel & Godula*

ATTORNEYS

INVENTORS
WILLIAM JEFFERS
JAMES MICHAEL JEFFERS
BY Dominick, Knechtel &
Godula
ATTORNEYS

ROLLING PIPE LINE ASSEMBLY, SYSTEM AND METHOD

BACKGROUND OF THE INVENTION

It is well-known in moving fluids across the country or from one location to another that in the usual system, surface or sub-surface pipe lines are utilized. For example, where it is desirable to move fluids such as oil from the wellhead to the ultimate destination, usually a transmission pipe line is constructed interconnecting the wellhead with a pipe transmission line for, in turn, transporting the oil cross-country to the ultimate destination. While such systems are beneficial for the owners of such international or intercontinental pipe lines, the economic factors facing independent well operators is significant. Usually, the independent operator is required to lease the pipe lines owned by others for the purpose of transporting the oil from his well, and such rentals are significant economic factors. In addition, usually the transmission time involved in transporting fluids through such transmission pipe lines is quite lengthy and it takes anywhere from 15 to 25 days for fuel to travel from say, a wellhead in Texas to a market in Chicago, for example.

Another problem associated with transporting fluids through a surface or sub-surface fixed pipeline is the fact that the capacity of such pipe lines has already been reached and in order to transport greater amounts of fluids, larger pipe lines are required. It is already presently apparent that the fuel requirements for many of the major cities have greatly increased as the population centers have expanded and in some instances in the recent past, the various major metropolitan areas have not been able to obtain the fuel requirements necessary during peak periods. Part of the reason for the shortcomings is the fact that these transmission pipe lines are not presently able to handle the large volume of fluid fuel, which must be transmitted from the wellheads to the Eastern markets.

In addition, various small town areas of lesser population have experienced difficulties in obtaining proper fuel requirements due to the fact that these town and cities are not ideally located as an end point or destination point in a fixed pipe line transmission system. Hence, such small communities must usually rely upon trucks to receive their quota of fuel requirements, which thereby necessitates the passage of additional time before the fuel can be delivered. Of course, this problem causes additional social and economic problems since small communities therefore have difficulties in attracting other industry which would provide economic employment for the members of the community. Hence, the delay, or in some cases, lack of fuel requirements, poses an economic threat to small communities.

The prior patented art does disclose various types of systems wherein a plurality of tanks are interconnected by means of a series of pipes. For example, in U.S. Pat. No. 725,793, there is shown a drainage system wherein a plurality of reservoirs or tanks are interconnected by means of a series of pipes whereby a fluid such as water may be distributed throughout the system. However, it should be noted that such systems does not have any removable connector members, nor is the system designed to load, transport and subsequently unload fluids from a rolling pipe line primarily for the purpose of transporting fluids from one location to another. Similarly, in U.S. Pat. No. 3,095,893, there is shown a system for emergency water storage and distribution used in conjunction with building water distribution systems and the like. Once again, there is shown a series of reservoirs or tanks which are interconnected by means of pipes having valves interposed in the line to open and close various of the plurality of tanks. Such systems are not designed for the purpose of moving liquids from one location to another nor does the same function in this manner. Similar comments are applicable with respect to U.S. Pat. No. 2,268,086 wherein once again a series of tanks is shown interconnected and in fluid communication by means of a series of fixed pipes which function solely for the purpose of transmitting fluid from one tank to another, and the system is not designed to transport fluids over long distances as an integral system.

Similar comments are applicable with respect to U.S. Pat. No. 1,234,625, which shows a system of water distribution especially adapted for use in connection with railway passenger trains, the system disclosed therein being for the purpose of supplying water to each of the cars in the train from a central or main supply tank and hence, does not teach and is not concerned with the problem of moving fluids as such in an integral system.

In U.S. Pat. No. 1,221,240, there is shown an air line pipe connection system for use in connection with railway cars and has for its object the provision of auxiliary pipe connections for supplying compressed air to the several cars in the train. It will be appreciated that the system is not designed to provide fluid communication between tank cars for the purpose of loading and transporting fluid as such, but merely shows a system for interconnecting the cars in order to supply compressed air to each of the cars in the train. Similarly, U.S. Pat. No. 1,361,666, is once again directed to a system for interconnecting train cars in order to supply each of the cars in the train with a source of compressed air and is not concerned with the function of providing an integral system which is, in effect, a rolling pipe line.

As has been indicated hereinabove, to date there has been no system proposed other than fixed pipe transmission lines for transporting fluids, such as fuel oil and the like, over long distances from the point of origin, such as a wellhead to the point of ultimate use, such as an oil refinery, or the like. Hence, the system of the present invention, as well as the method described herein is primarily designed for the purpose of offering alternative solutions to the problem of moving fluids over great distances while at the same time minimizing the cost to the operator.

Hence, the present invention provides a convenient means for loading fluids at the point of origin thereof and transporting those fluids to the market area where such fluids are needed, in a reduced period of time, for a lesser economic cost, and which in effect, expands the market areas where such fluids may be utilized. These and other problems are overcome by the system and method of the present invention, since the system proposed herein takes advantage of the railway network presently existing in this and other countries and incorporates therein the concept of a continuous pipe line resulting in a system which can travel to the point of origin of the fluid involved, load the fluids in an efficient manner and at low cost, and transport the same to the desired market area. In addition, the various components illustrated in connection with the present system may be incorporated in the existing equipment at a fairly nominal cost thereby obviating the necessity of having to expend great sums of money in order to make the present system practically applicable.

In view of all the above problems, it is the object of this invention to provide an improved system for moving fluids such as fuel oil and the like, from the point of origin of such fluids, such as a wellhead to the ultimate market, which obviates many of the problems discussed above.

It is therefore the principal object of the present invention to provide a movable system for accommodating the consecutive loading, transporting and unloading of fluids by means of a plurality of wheeled tank cars which includes a plurality of such wheeled tank cars being removably connected one to the other, each of the tank cars being provided with conduit means adjacent the opposed ends thereof and connector means for interconnecting adjoining tank cars thereby to establish fluid communication as between adjoining tank cars, whereby a plurality of such tank cars may be efficiently loaded at the point of origin of the fluid by merely connecting the last tank car to the wellhead via a pump and pumping in the desired amount of fluids, after which all the appropriate valves may then be closed in order to retain the fluids within the tank cars, and then the tank cars transported to the destination point and there unloaded.

Another object of the present invention is to provide a system for loading, transporting, and unloading fluids in a plurality of interconnected tank cars being in fluid communication one to the other, the improvement consisting of flexible connector means for interconnecting adjoining tank cars whereby once loaded, the tank cars may remain interconnected and in fluid communication during transit, thereby to facilitate unloading at the point of destination.

Another object of the present invention is to provide a system of the type set forth above wherein the connector means include engagement means for disengageably engaging adjoining tank cars thereby to secure the connector means in position during loading, transit and unloading of said tank cars.

A further object of the present invention is to provide a system of the type described wherein the connector means includes evacuation means associated with the connector means whereby fluids disposed within the connector means may be evacuated into the adjoining tank cars during transit, thereby to prevent accidental spillage of fluids from the connector means.

Still a further object of this invention is to provide a method for sequentially loading, transporting and unloading fluids from a plurality of interconnected tank cars which consist of the steps providing a plurality of wheeled tank car assemblies each of the tank car assemblies having a storage tank and conduit means extending outwardly from each of the opposed ends of the tank car, interconnecting adjacent conduit means by means of a connector member to establish fluid communication therebetween and interconnecting the plurality of tank cars, loading the tank cars with a fluid by pumping the fluid through the interconnected tank cars until the desired number of tank cars have been filled with such fluid, transporting the tank cars to the desired destination, and unloading the tank cars by pumping the fluid through the interconnecting tank cars until same are empty.

Another object of this invention is the provision of a novel connector member for interconnecting a plurality of tank car assemblies, wherein each of the tank cars is provided with a pair of conduit means extending outwardly from opposed ends thereof, the connector member being so constructed as to slidably engage adjacently extending conduit means thereby to establish fluid communication between adjoining tank cars through the conduit means and the connector member, whereby fluids may be introduced into and withdrawn from a plurality of such interconnected tank cars, thereby obviating the necessity of filling and emptying each of the tank cars individually.

Further features of the invention pertain to the particular arrangement of the elements and parts whereby the above-outlined and additional operating features thereof are attained.

The invention both as to its organization and method of operation, together with further objects and advantages thereof, will best be understood by reference to the following specification taken in connection with the accompanying drawings in which.

Figure 1:
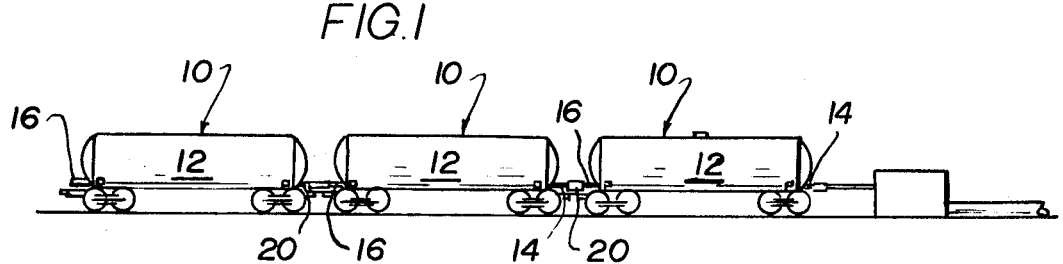
FIG. 1 is a plan view showing a series of three tank cars interconnected in fluid communication and connected to a wellhead pump in accordance with the present invention.

Referring now to FIG. 1 of the drawings, there is shown a series of three railway-type wheeled tank cars, generally designed by the numeral 10, each of the tank cars 10 usually consisting of a storage tank 12 mounted on an underlying support carriage (not shown), the carriage having two pairs of wheeled axles adjacent each end thereof and provided with a series of eight wheels per carriage, in the manner known in the art. Each of the tank cars 10 is provided with a first conduit 14 extending outwardly from adjacent one end thereof and a second conduit 16 extending outwardly from the storage tank 12 from adjacent the opposed end thereof. The conduits 12 and 14 of adjacent tank cars 10 are so constructed that when the tank cars are interconnected in the manner known in the art, the first conduit 14 of one tank car is in horizontal alignment and in opposed relation with respect to the second conduit 16 of the next adjoining tank car 10. Each of the conduits 14 and 16 are in fluid communication with the storage tank 12 of the corresponding tank car 10, and hence, when the tank cars 10 are connected via the connector members as will be disclosed hereinafter, all of the tank cars which are interconnected within the train assembly are therefore placed in fluid communication one with respect to the other.

Figure 2:
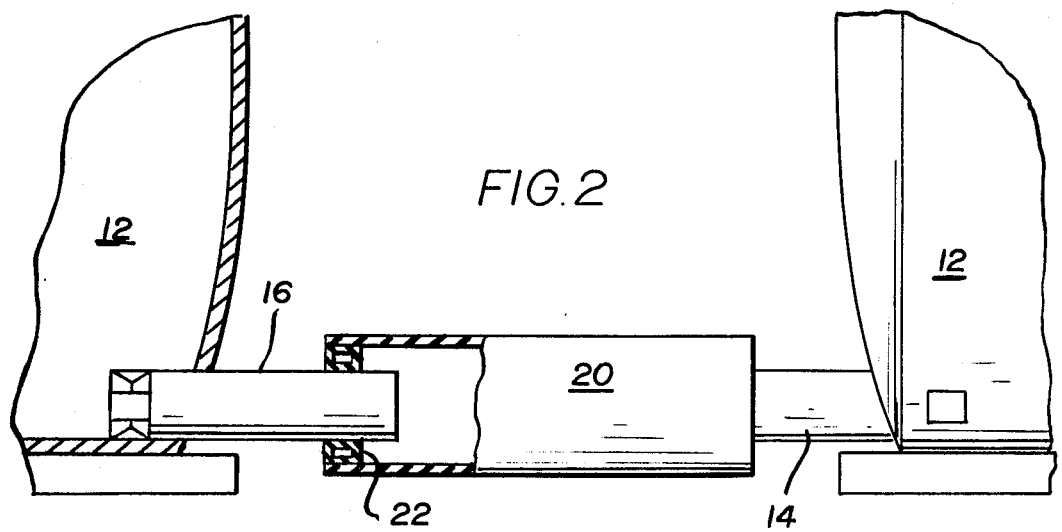
FIG. 2 is an elevational view, partly in cross-section, showing the means for interconnecting adjoining tank cars via the connector member of the present invention.

When the tank cars 10 are disposed in interconnected relationship one with respect to the other in the manner described above, the first conduit 14 of one tank car 10 is disposed in opposed and horizontal alignment with the second conduit 16 of the next adjoining tank car 10. The adjacently disposed conduits 14 and 16 respectively, may then be interconnected in fluid communication by means of a tubular connector member 20 as shown in FIG. 1 of the drawings, and more particularly show in FIG. 2 of the drawings. The connector member 20, is shown to have an internal diameter substantially greater than the external diameter of either of the conduits 14 and 16 connected to the storage tanks 12. In this manner, the connector member 20 may be slidably disposed over the outside ends of the adjacent conduits 14 and 16 and thereby establish fluid communication thereacross. Various embodiments of connector members 20 are contemplated within the purview of the present invention. In FIG. 2 for example, the connector member 20 is shown to include an annular inflatable collar 22 which is positioned along the internal peripheral edge of the connector member 20, one inflatable collar 22 being disposed at each of the two ends of the connector member 20. Once the connector member has been slidably disposed onto each of the outer ends of the adjacent conduits 14 and 16, the tubular collars 22 may then be inflated whereby the tubular collars are caused to press tightly against the external peripheral surface of the corresponding conduit 14 and/or 16. In this manner, the tubular connector member 20 is held firmly in place with respect to each of the two conduits 14 and 16 and may remain in this position while the train is in transit. Hence, in this manner, a novel and useful purpose of the present invention is accomplished since the necessity of individual loading and unloading of each of the tank cars 10 is eliminated.

Figure 3:
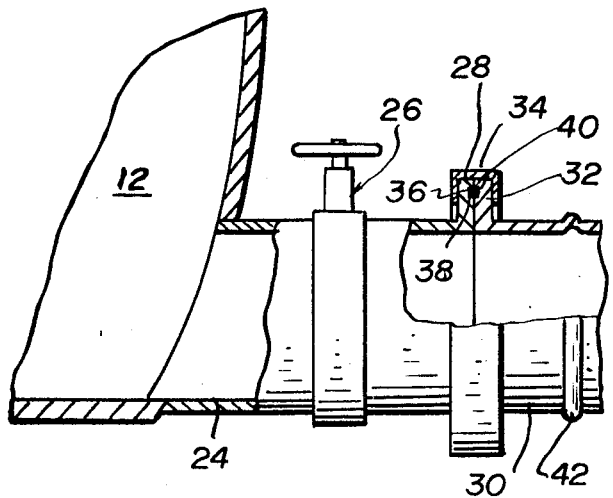
FIG. 3 is an elevational view, partly in cross-section, showing another embodiment of the connector member in connected relationship with the conduit means of a tank car.

In FIG. 3 of the drawings, there is shown another embodiment of a connector member associated with a related conduit of a tank car which similarly accomplishes all the objects and advantages to be gained by the present invention. For the sake of simplicity, identical parts are numbered with the identical numerals. It will be observed that there is shown a storage tank 12 having a conduit 24 extending outwardly therefrom. The conduit 24 is provided with a manual valve 26 which, in normal usage, operates to open and close the conduit 24 with respect to the storage tank 12. The outer end of the conduit 24 includes a peripheral flanged lip 28 which functions as the seat against which the connector member will sit in use. The connector member 30 is shown to be in the form of a tubular member and similarly includes a peripherally flanged lip 32 which is of equal size and proportions with respect to the lip 28 of the conduit 24. In use, the flange lip 32 of the connector member 30 is disposed in mating relation with the flanged lip 28 of the conduit 24, and a U-shaped annular band 34 is mounted over and caps the two peripheral lips 28 and 32 respectively thereby to hold the same in fixed relation with respect to one another. The band 34 has an internal width which is approximately equal to the combined thicknesses of peripheral flanged lips 28 and 32 respectively, whereby the band 34 holds the lips 28 and 32 in fluid-tight mating relation. In order to facilitate the fluid-tight seal therebetween, an O-ring 36 is provided which seats in annular channels 38 and 40 of lips 28 and 32 respectively.

The connector member 30 may be formed of a somewhat flexible metallic material, such as for example, aluminum or an aluminum alloy, or spring steel, and in order to lend additional structural support to the connector member 30, one or more annular beads 42 is designed into the connector member 30 whereby not only is flexion movement of the connector member 30 facilitated but also additional structural support is achieved thereby.

It is clear from viewing the structure in FIG. 3 of the drawings, that the system of the present invention would require that the conduit 24 of each storage tank 12 be identical in shape, size and construction. That is, it is presumed that the connector member 30 would be constructed in a perfectly symmetrical manner such that both ends of the connector member 30 would be identical. Hence, in order to have the system function efficiently, each of the conduits 24 would have to be identical in size and shape so that the respective peripheral flanged lips 28 and 32 would be in mating relation when the same were joined together by the annular band 34. While this construction will permit the system of the present invention to be operational, nevertheless, one potential drawback of such construction is that in the event the conduits of adjoining tank cars should be different in size, then a connector member of the type referred to by the numeral 30 in FIG. 3 could not be utilized.

Hence, in another embodiment of the present invention, this problem has been obviated by constructing the connector member in a slightly different fashion.

Figure 4:
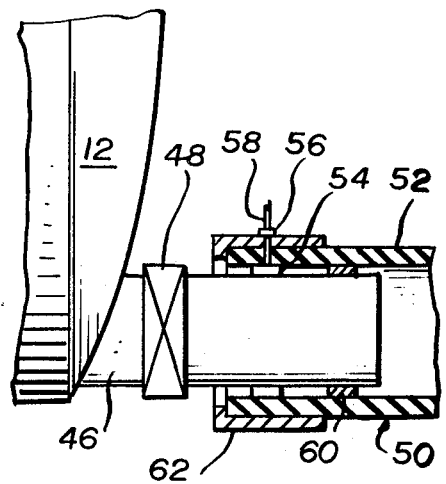
FIG. 4 is an elevational view, partly in cross-section, showing still another embodiment of a connector member in accordance with the present invention in connected relationship with the conduit means of a tank car.
Figure 6:
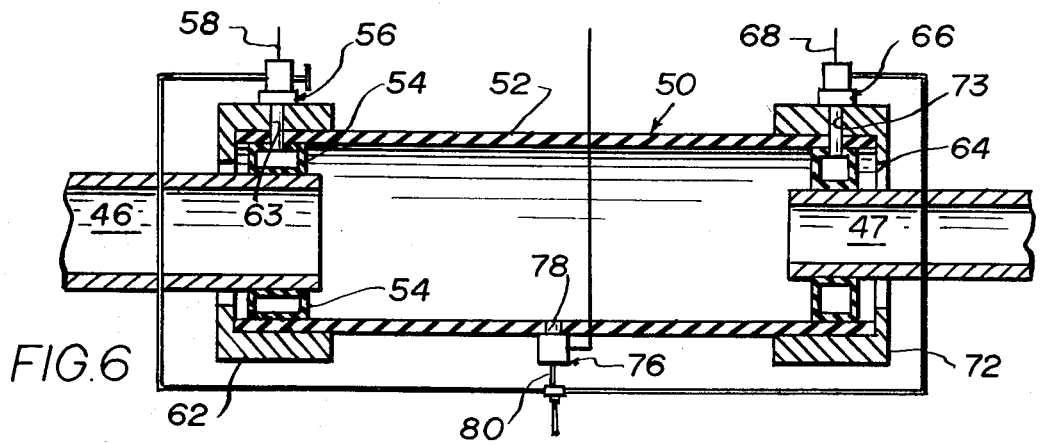
FIG. 6 is a side cross-sectional view showing a connector member in accordance with the present invention in connected relationship with the conduit means of adjoining tank cars, the connector member being shown in the engaged position.

The preferred embodiment of the connector member in accordance with the present invention is more clearly depicted in FIGS. 4 and 6 of the drawings. With respect to FIG. 4 there is shown a storage tank 12 having a conduit 46 extending laterally outwardly therefrom adjacent an end thereof and provided with a valve 48 for opening and closing the flow path as between the storage tank 12 and conduit 46. The valve 48 may be of the manual type as shown in FIG. 3 of the drawings, or may be an electrically or hydraulically controlled valve of the type generally known in the art. The connector member 50 comprises a tubular member 52 which, in the preferred embodiment, is formed of a flexible material such as rubber, the tubular member 52 having an internal diameter slightly greater than the external diameter of the conduit 46. The connector member 50 includes an annular inflatable collar 54 which is peripherally disposed along the inner wall of the connector member 52 adjacent the end thereof and is connected to a source of pressurized air through a valve 56 and a fluid line 58 respectively. Once the connector member 50 is mounted on a corresponding conduit 46, and the inflatable collar 54 inflated by means of compressed air from the source of compressed air, which is usually carried aboard the engine of the train, a fluid-tight connection relationship is established between the conduit 46 and the connector member 50. Optionally, the connector member 50 may be provided with a second inflatable collar 60, spaced inwardly from the first inflatable collar 54, and constructed in the same manner. The second collar 60 ensured engagement and a fluid-tight seal in the event the first collar 54 loses pressure or is damaged in any manner. To further ensure that a fluid-tight engagement is achieved between the connector member 50 and the conduit 46, an annular retention band 62 encircles the end of the connector member 50 and maintains the connector member 50 in engaged relation with respect to the conduit 46. Ideally, the annular retention band is formed of a metallic material, such as aluminum, steel, or other such material, and is suitable apertured as shown at 64 in order to accommodate the valve 56 therethrough.

The detailed construction of this embodiment of connector member 50 is more particularly shown in FIG. 6 of the drawings. It will be appreciated that as shown in FIG. 6, this view is intended to convey the construction of the connector member 50 when connected to adjoining conduits extending outwardly from adjoining tank cars. In this view, it will be noted that conduit 46 has a dimension somewhat greater than the opposed conduit 47, which extends outwardly from the next adjoining tank car.

It will be noted that the connector member 50 is constructed similarly on both sides thereof. That is, the opposed end of connector member 50 is shown to similarly include an inflatable collar 64 which is inflated by means of compressed air which enters the collar 64 through a valve 66 which is connected to the compressed air by means of a fluid line 68. The opposed end of the connector member 50 is rigidly secured to the conduit 47 by means of an annular retention band 72 which is constructed in a manner similar to the retention band 62 on the opposed end of the connector member 50. Once again, the annular band 72 is suitable apertured as at 73 in order to accommodate the valve structure 66 therethrough and establish fluid communication between the fluid line 68 and the annular band 64.

As shown in FIG. 6 of the drawings, another feature of the present invention is illustrated. In the practical embodiment of the present invention, it is clear that in the event the train having interconnected tank cars is carrying a fluid such as fuel oil or the like, there is the possibility that the connector member 50 could rupture thereby causing a fluid spill to occur during transit. In order to obviate this danger, it will be noted that the connector member 50 is provided with an additional valve 76 which is in fluid communication with the interior of the connector member 50 via port 78. Externally, the valve is connected by a fluid line 80 to a source of pressurized compressed air aboard the engine and by the operation of the valve, either manually or in the preferred embodiment, by means of an electrical or hydraulic switch system, compressed air may be forced into the connector member 50 through the fluid line 80, valve 76 and port 78, thereby to force the fluid existing in the connector member 50 into the adjoining tanks through the conduits 46 and 47 respectively. Hence, once the fluid has been loaded aboard the desired number of tank cars, a master switch FIG. 5 may be operated to force compressed air into the connector member 50 and evacuate the fluids therefrom into the adjoining storage tanks of the tank cars 10. Thereafter, the train may be activated into the transit posture and the fluid transported from one location to the other without the danger of having a spill due to the rupture of any one or more connector members 50.

Figure 7:
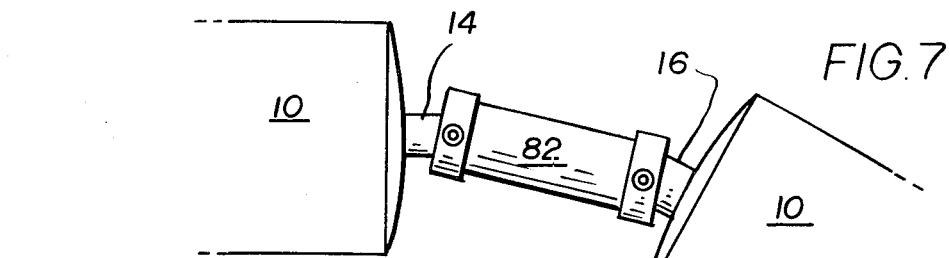
FIG. 7 is a top view showing one embodiment of an inflexible connector member connected to adjoining tank cars and illustrating the manner in which the tank cars may move around a curved track, the connector member permitting angular movement of one tank car with respect to the other.
Figure 8:
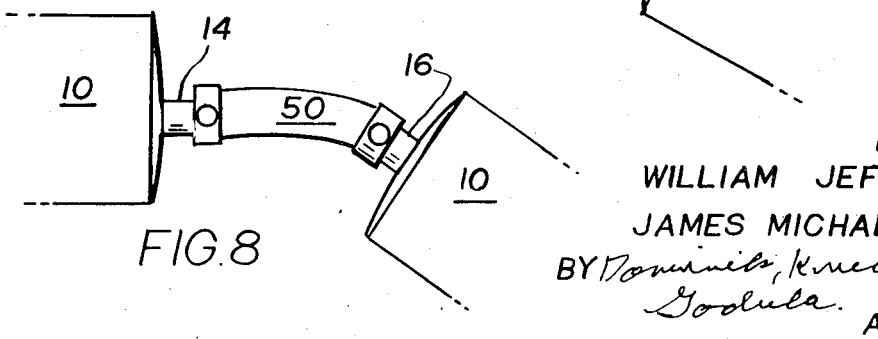
FIG. 8 is a top view of another embodiment of a flexible connector member according to the present invention, which flexes to permit curved movement of one tank car with respect to the other, as the same travel about a curved path.

In FIGS. 7 and 8 of the drawings, the advantages to be gained by either the flexible type or inflexible type connector member is illustrated. In FIG. 7 of the drawings, a pair of adjoining tank cars 10 are shown to have outwardly extending and opposed conduits 14 and 16 in the manner described hereinabove. Connector member 82 is shown to be constructed in the manner as described with respect to FIG. 6 of the drawings, and is formed of an inflexible material, such as a lightweight steel or heavy grade aluminum, or the like. The relative angular flexion movement necessary in order to accommodate the curved movement of tank cars as for example, around curved tracks is accomplished by means of the inflatable collars, such as collars 54 and 64 in FIG. 6. Hence, where the train goes around a curved track section, and the tank cars are in an angular disposition with respect to one another, conduit 16 is permitted to move in an angular disposition with respect to conduit 14 due to the construction of the inflatable collar which redistributes the air disposed therein to accommodate such movement. Hence, the function to be accomplished by virtue of the present invention may be accomplished even though the connector member 82 is inflexible due to the provision of the inflatable collars as described above.

In FIG. 8 of the drawings, there is shown a pair of adjoining tank cars 10, each having conduits 14 and 16, respectively, extending outwardly therefrom. The conduits 14 and 16 are interconnected by connector member 50 which is constructed in the manner as depicted in FIG. 6 of the drawings. In this embodiment the connector member 50 is formed of a flexible material such as rubber or the like, and therefore, as the train moves around a curved section of track and the tank cars are disposed in an angular disposition with respect to one another, the necessary angular motion is achieved by virtue of the flexibility of the material of which the connector member 50 is formed.

In either embodiment, that disclosed in FIG. 7 and that disclosed in FIG. 8 of the drawings, one of the principal features of the invention is nevertheless accomplished, that is, the ability to have interconnected tank cars interconnected by means of a connector member which establishes fluid communication thereacross which need not be removed when the train is in transit from one location to another. Hence, in this manner, the train may be parked at a wellhead or the like, and fluid loaded into a series of tank cars by merely opening all the main valves in the conduits extending outwardly from each of the storage tanks, thereby to extablish fluid communication throughout the train. Once the desired volume or quantity of fluid has been pumped into the series of tank cars, a master switch may be activated thereby to activate each of the evacuation valves, such as for example, valve 76 in FIG. 6., thereby to evacuate any fluid existing in any of the connector members 50, the fluid being forced into adjoining tank cars in the manner described hereinabove. A check valve or relief valve (not shown) may be provided to release this pressurized air from the connector members as evacuation is achieved. Once evacuation of this fluid has been achieved, the valves in each of the conduits such as 46 and 47 respectively may be energized into the closed position thereby to compartmentalize the fluid in each of the respective tank cars. In this posture the train may then be activated into its transit posture and the fluid thereby transported to an ultimate destination point. Once the train has arrived at the ultimate destination, the above process is merely reversed in that all of the respective conduit valves are opened thereby re-establishing fluid communication between all of the tank cars of the train and subsequently, a pump connected to the end tank, may be activated to pump all of the fluid from the series of tank cars.

Figure 5:
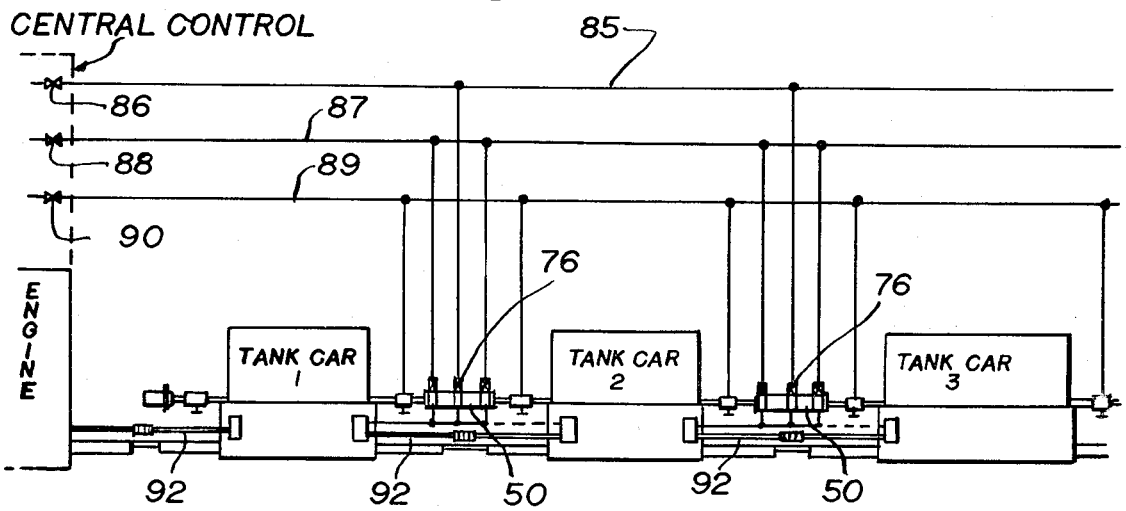
FIG. 5 is a schematic diagram illustrating the means by which the various tank cars are interconnected and the central control means for controlling the engagement means and evacuating means with respect to each of the connector members in a series of such similar connector members.

It is clear that the preferred embodiment of the present invention envisions a master control for controlling the valve assemblies for each of the inflatable collars in each of the connector members as well as the evacuation valve in fluid communication with the connector member, and the conduit valves for opening and closing the conduit with respect to the storage tank in each tank car. The overall scheme of the preferred embodiment is illustrated in FIG. 5 of the drawings wherein there is shown a series of three tank cars which are connected to one another and to an engine in the normal manner as is known in the art. Each of the connector members is referred to by the numeral 50 for the reason that the connector member as depicted in FIG. 6 of the drawings is considered to be the preferred embodiment. In the interconnected posture, it will be noted that there is a master control line, the preferred type of energized line being electrical in nature, for each of the valve assemblies as described hereinabove. Hence, line 85 is shown to be operatively connected to the evacuation valve, 76, and in series with each of said evacuation valves 76, throughout the entire length of the train. In this manner when the master switch 86 is activated aboard the engine, each of the evacuation valves is caused to operate thereby to evacuate fluid from each of the connector members 50 throughout the length of the train. Another line 87 is shown to be operatively connected to the valves associated with the two inflatable collars at each end of each connector member 50. Hence, when switch 88 is activated, each of the inflatable collars of each of the connector members is caused to inflate, thereby to secure each connector member in position, and in fixed relationship with respect to the opposingly adjacent conduits. Similarly, line 89 is shown to be in operative communication with the conduit valves which function to open and close the fluid path between each storage tank of a tank car and the conduits extending therefrom. Hence, when switch 90 is activated each of the conduit valves along the complete length of the train is activated to either be placed in the open or closed position as desired.

It is known that every engine contains a source of compressed air aboard and in order to provide compressed air for the evacuation valve as well as the inflatable collars, a compressed air line 92 is shown to interconnect between all of the adjoining tank cars throughout the entire length of the train. It is therefore apparent that the system and method as envisioned by the present invention is suitably designed for installation upon and existing train facility, the only adaptation necessary is that the opposed conduits extending from each tank car be installed thereon. Therefore, other than minor modifications, the present system is presently feasible not only from a practical standpoint, but also from an economic standpoint at the present time.

It is further apparent from the above description, that the particular dimensions of the storage tank of the tank car, the tank car conduits and the connector members, are relatively unimportant with regard to the present invention. The normal tank car has a 33,000 gallon capacity and it is contemplated that a 16-inch connector pipe could be utilized. Such a train could carry 80,000 barrels and have a loading and unloading capacity of a 32-inch pipe line since a pair of pumps could be utilized to load and/or unload the train and since each of the pipes would have a 16-inch diameter, the net effect would be a capacity of a 32-inch pipe line. In terms of actual time, a pump of known construction of these dimensions will load or unload such a train in 44 minutes with one pump from each end of the train and the use of two pumps would reduce the time down to 22 minutes.

The inflatable collars envisioned in the present invention will withstand a working maximum pressure of such a pump in the area of 200 pounds. Since there is up to 90 pounds available from the train compressed air line, the inflatabel collars are designed herein would have an outside total working pressure of 754 pounds against the connector and 503 pounds against the pipe conduit from each tank car, if 10 pounds of pressure is used in the inflatable collar. In the event that 50 pounds of pressure is used in the inflatable collar, there would be 3,750.5 pounds of pressure against the connector and 2,565 pounds against the pipe conduit from the car. In any event, these quantities are all variable depending upon the particular construction of the assembly as disclosed above as well as the materials of which the various elements are formed.

It will be apparent from the above description that the invention as described herein accomplishes all of the objects and advantages as set forth hereinabove. In fact, this invention provides a system for loading, transporting, and unloading fluids from a rolling pipe line assembly consisting of a plurality of tank cars interconnected and in fluid communication one with respect to the other, which permits the complete series of tank cars to be loaded by means of a single pump or a pair of pumps at the point of origin of the fluids, transported to the ultimate destination and unloaded by merely reversing the loading process. The net result is the provision of a rolling pipe line which is practically and economically feasible for existing railway equipment with only minor modifications, while at the same time minimizing the degree of manual manipulation necessary to operate the system. In addition, a novel form of connector member has been provided which is easily installed with a minimum of manual effort and which will, nevertheless, provide fluid-tight fluid communication between adjacent tank cars, thereby to facilitate the loading and unloading of a complete series or plurality of such tank cars. Additionally, the connector member of the present invention is so constructed that the connector members may remain in position while the train is in transit and at the same time avoid any problem in connection with spillage since a novel type of evacuation means has been provided for evacuating fluids from the connector members while the train is in transit. All of the above objects and advantages, as well as additional objects and advantages have therefore been realized by the system and method of the present invention as described and disclosed hereinabove.

While there has been described what at present is considered to be the preferred embodiment of the invention, it will be understood that various modifications may be made therein and it is intended to cover in the appended claims all such modifications as fall within the true spirit and scope of the present invention.

What is claimed is:

1. A movable system for accommodating consecutive loading, transporting and unloading fluids in a plurality of wheeled tank cars comprising in combination a plurality of wheeled tank cars removably connected, each of said tank cars including a fluid storage tank, conduit means extending outwardly adjacent one end of said storage tank and conduit means extending outwardly adjacent the opposed end of said storage tank, each of said conduit means being in fluid communication with said storage tank, connector means removably engaged to and interconnecting adjacent conduit means extending from adjoining tank cars, said connector means establishing fluid communication between adjoining tank cars, whereby fluids may be consecutively pumped through a series of said tank cars until said tank cars are loaded, transported and unloaded while said connector means remains engaged on said adjacent conduit means thereby facilitating the loading, transporting and unloading of fluids.

2. The system as set forth in claim 1 above, wherein said conduit means each comprises an rigid pipe fixedly mounted on said tank car and in fluid communication therewith.

3. The system as set forth in claim 1 above, wherein said connector means comprises a flexible tubular coupler member having an internal diameter slightly greater than the external diameter of said conduit means whereby said tubular coupler is slidably mountable over each of the ends of adjacent conduit means thereby to establish fluid communication therebetween.

4. The system as set forth in claim 3 above, wherein said tubular coupler is formed of a flexible metallic material.

5. The system as set forth in claim 3 above, wherein said tubular coupler is formed of a flexible rubber.

6. The system as set forth in claim 3 above, wherein said tubular coupler further includes engagement means for disengageably engaging the outer ends of adjoining conduit means respectively.

7. The system as set forth in claim 6 above, wherein said engagement means comprises a pair of inflatable collars fixedly secured along the inner peripheral surface of said tubular coupler, one of each said pair of inflatable collars being disposed at each end of said tubular coupler, and further provided with valve means for inflating and deflating said collars thereby to firmly grip and engage the outer surface of a corresponding end of said conduit means.

8. The system as set forth in claim 1 above, which further includes evacuation means in fluid communication with said connector means whereby fluids disposed in said connector means may be evacuated into said adjoining tank cars during transit thereby to prevent accidental spillage of fluids from said connector means.

9. The system as set forth in claim 8 above, wherein said evacuation means comprises a valve assembly in fluid communication with said connector means and connected to compressed air means whereby compressed air may be introduced into said connector means thereby to force the evacuation of fluids therefrom.

10. A wheeled tank car for receiving, storing and transporting fluids and adapted for interconnection in fluid communication with a pair of similar such tank cars comprising a storage tank mounted on a support frame having a plurality of wheels rotatably mounted thereon, first conduit means mounted on said storage tank adjacent one end thereof and in fluid communication with said storage tank and second conduit means mounted on said storage tank adjacent the opposed end thereof and in fluid communication with said storage tank, whereby fluids may be caused to flow through one of said conduit means into said storage tank and through the second of said conduit means thereby permitting a series of said tank cars to be interconnected in fluid communication one to the other facilitating the loading, transporting and unloading of fluids.

11. In a tank car assembly having at least a pair of tank cars interconnected and each of he tank cars including a storage tank mounted on a support frame having a plurality of wheels rotatably mounted thereon and first conduit means mounted on the storage tank adjacent one end thereof and extending outwardly therefrom and second conduit means mounted on the storage tank adjacent the opposed end thereof and extending outwardly therefrom and second conduit means mounted on the storage tank adjacent the opposed end thereof and extending outwardly therefrom, both of the conduit means being in fluid communication with the storage tank, a connector member for interconnecting adjacent conduit means extending outwardly from interconnected adjoining tank cars comprising a flexible tubular member having an internal diameter slightly greater than the external diameter of the conduit means, said tubular member being slidably mountable over each of two adjacent conduit means extending outwardly from interconnected adjoining tank cars to establish a fluid communication relationship therebetween, and engagement means for disengageably engaging said tubular member in fixed relationship with each of said adjacent conduit means, whereby a plurality of tank cars may be interconnected in fluid communication relationship by connecting adjacent conduit means of each pair of adjoining tank cars with one of said connector members thereby to facilitate the loading, transporting and unloading fluids from a plurality of such interconnected tank cars and avoiding the necessity of loading and unloading each of the tank cars separately.

12. The connector member as set forth in claim 11 above, wherein said flexible tubular member is formulated of a flexible spring steel.

13. The connector member as set forth in claim 11 above, wherein said flexible tubular member is formulated of a flexible rubber.

14. The connector member as set forth in claim 11 above, wherein said engagement means comprises a pair of inflatable collars fixedly secured along the inner peripheral surface of said tubular member, one of each of said pair of inflatable collars being disposed adjacent each end of said tubular member, and further provided with valve means for inflating and deflating said collars thereby to firmly grip and engage the outer surface of a corresponding end of said conduit means.

15. The connector member as set forth in claim 14 above, wherein each of said valve means of each of said collars are in fluid communication with a master fluid line whereby all of said collars may be inflated simultaneously fixedly securing said tubular members in position and establishing fluid communication between the interconnected tank cars.

16. A method for sequentially loading, transporting and unloading fluids from a plurality of interconnected tank cars comprising the steps of providing a plurality of wheeled tank car assemblies each of the tank cars including a storage tank, first conduit means mounted on the storage tank adjacent one end thereof and extending outwardly therefrom and second conduit means mounted on the storage tank adjacent the opposed end thereof and extending outwardly therefrom, the first and second conduit means and storage tank all being in fluid communication one to the other, interconnecting adjacent conduit means extending outwardly from adjoining tank cars by means of a connector member to establish fluid communication therebetween and interconnecting the plurality of tank cars, loading said tank cars with a fluid by pumping the fluid through said interconnected tank cars until the desired number of said tank cars has been filled, transporting said tank cars to the desired destination, and unloading said tank cars by pumping the fluid through said interconnected tank cars until the same are emptied.

* * * * *